United States Patent Office 3,533,803
Patented Oct. 13, 1970

3,533,803
PREPARATION OF MEAT PIECES AND PRODUCT
Warren R. Schack, Western Springs, and Francis Glenn Connick, Downers Grove, Ill., assignors to Swift & Company, Chicago, Ill., a corporation of Delaware
No Drawing. Filed Jan. 6, 1967, Ser. No. 607,664
Int. Cl. A22c *18/00;* A23b *1/00*
U.S. Cl. 99—107                13 Claims

ABSTRACT OF THE DISCLOSURE

A method for preparing meat pieces having a relatively firm outer surface and a tenderized core useful in the preparation of canned and frozen meat products. The method comprises introducing a proteolytic enzyme into the meat pieces, then, selectively deactivating the enzyme in the outer layer of meat and, ultimately, activating the enzyme in the interior of the meat in order to tenderize the meat.

---

The present invention relates to a new and improved method for preparing meat for use in cooked meat products and to the solid meat pieces prepared thereby. More particularly, it relates to a method for processing solid meat pieces of whatever shape desired, utilizing the enzymic action of proteolytic enzymes, said meat pieces possessing improved properties for use in cooked meat products.

Historically, procedures have been employed wherein containers are filled with product formula, including liquid constituents or fillers, and then the containers are sealed and subjected either to a relatively prolonged heating or to quick freezing. When either of these procedures is employed, problems arise as to the tenderness of the meat in the product. Heating, which is primarily intended to sterilize the product, also cooks it, and this prolonged cooking tends to over-soften the meat. Frozen meat products such as beef pot pies and the like tend to be insufficiently tender and require careful selection of meat or careful handling to provide sufficient tenderness of the meat prior to freezing.

Recently, high temperature-short time canning procedures have been devised which substantially reduce the period of time needed to sterilize a canned product. As a consequence, the time which the product is subjected to cooking is considerably reduced. This factor gives rise to a distinct problem with regard to the tenderness of the meat component of products wherein pieces of meat are employed, such as beef stew, beef stroganoff, beef goulash, beef pot pie, and the like. Because of the new shorter heating times, the meat is not adequately tenderized, and if the meat is not tenderized prior to canning, it will be too tough to appeal to the consumer. However, if the meat pieces are fully cooked prior to canning, there is a problem of the meat pieces breaking up during handling when the can is subjected to agitating type retorting or during high temperature-short time sterilization. Additionally, if the meat pieces are completely pretenderized, normal handling can agitate the meat sufficiently to cause the outer layer of the meat to continually shred off.

It is also desirable to develop a procedure for preparing meat pieces to be used in canned meat products which are canned under high temperature-short time canning methods such as are described in U.S. Pat. No. 3,232,770, for example, wherein the products are subjected to pumping action during processing. Said meat pieces should possess properties such that they will be tender enough for consumer acceptance of the product, yet will be durable and stable enough to retain their shape during processing and in the can until ultimate consumption.

It is, therefore, a principal object of the present invention to provide a new and improved meat product and method of preparing same for use in cooked meat products.

It is a further object to provide new and improved solid meat pieces and a method of preparing same which can be used in high temperature-short time canning procedures more efficiently and economically than has heretofore been possible.

It is a still further object to provide new and improved meat pieces and a method for preparing said meat pieces which possess properties such that the pieces have sufficient durability and stability to retain their shape during high temperature-short time canning procedures and subsequently until ultimate consumption, while exhibiting the requisite degree of tenderness as a canned or cooked meat product to satisfy consumer demands.

Other objects will be apparent to one skilled in the art from the following detailed description of the invention.

In general, the present invention relates to a method for preparing meat pieces for use in cooked meat products such as beef stew, beef stroganoff, beef pot pies, beef goulash, and the like. The meat pieces prepared by this process have a relatively firm surface which provides sufficient rigidity to the meat pieces to withstand the various processing procedures of a high temperature-short time canning process and which also exhibit desirable tenderness characteristics. It has been found that such properties may be obtained by dispersing throughout the meat, proteolytic enzymes such as papain, bromelain, ficin, trypsin and the like, and mixtures thereof, and, following this treatment, deactivating the enzyme at the surface of the meat pieces and then activating the enzyme throughout the interior portions. The product thus formed has a tenderized center, but a surface of sufficient firmness to withstand processing and storage.

More specifically, the method of the present invention comprises introducing a proteolytic enzyme into a primal meat cut by any convenient procedure, either ante- or post-slaughter of an animal. Ante-mortem introduction of the enzyme into the meat may suitably be performed by injection as described in U.S. Pat. No. 2,903,362 to Beuk et al. Exemplary of methods suitable for post-mortem introduction of the enzyme into the meat cut are syringe injection, gas propellant injection, puncturing the surface of the meat and placing the meat cut in contact with an enzyme solution so that the enzyme will permeate into the meat, and any other convenient procedure. The amount of enzyme to be introduced may vary within a broad range depending upon the degree of tenderization desired, the type of meat being treated, the initial toughness or tenderness of the meat, and other like considerations. However, it has been found that the amount of enzyme introduced into the meat should be at least about .001 mg. of enzyme per pound of meat.

Once the enzyme has been introduced, an amount of time is allowed to elapse in order to attain distribution of the enzyme throughout the meat. In a preferential embodiment of the invention, the enzyme is allowed to disperse throughout the meat in a substantially uniform manner. The holding period employed in this step is variable, and is dependent upon many factors such as the amount of enzyme introduced into the meat, the size of the primal meat cut when the enzyme is injected post-mortem, the degree of dispersion of the enzyme desired, and the like. Perhaps the most important factor in determining the holding time when post-mortem techniques are employed is the temperature of the meat at the time the enzyme is introduced therein. It has been determined that when the meat temperature is about 80° F. the holding time to allow for dispersion of the enzyme may be as short as about one hour or less, but at lower temperatures the holding time is considerably longer. For example, at a meat temperature of about 45° F., the holding time should be about 4 hours, and at temperatures of between about 30° F. and about 40° F. the holding time should be about 24 hours. Notwithstanding, the longer holding times required when the meat is at these lower temperatures, it is preferred to work at said lower temperatures as a matter of economy since the cost of reducing the temperature of the meat to its optimal temperature for cutting into the desired shaped pieces, i.e., between about 26° F. and about 32° F., will be considerably diminished.

After the enzyme has been allowed to disperse throughout the meat, the meat is cut into pieces. The meat pieces may be any shape desired, such as cubes, chunks, strips, slices, slabs, etc. It has been determined that the dimensions of these cut pieces should be at least ¼ inch per side. As above-mentioned, the cutting operation is preferably performed when the temperature of the meat is reduced to between about 26° F. and about 32° F.

The next step in the method of the present invention is to selectively deactivate the enzyme in the outer layer of the meat piece to a sufficient depth so that this outer layer will act as a protective cover for the meat piece. This deactivation can be accomplished by adjusting the temperature of the meat pieces to a temperature such that the enzyme in the outer layer of meat will be deactivated. This temperature adjustment may be made by any convenient surface heating technique such as by immersing the meat pieces in boiling water or in a gravy, or by radiation, or the like. The duration of the heating and the temperature to which the meat pieces must be subjected is variable within a broad range and is directly related to the particular enzyme being used, and also to the concentration of enzyme which has been introduced into the meat.

The generally accepted temperatures for proteolytic enzyme activity are in a range of from approximately 98° F. to about 185° F. with varying specific optimal temperature ranges for specific enzymes, e.g., the optimal temperature range for papain activity is from about 150° F. to about 185° F., the optimal temperature range for bromelain activity is from about 140° F. to about 160° F., the optimum temperature range for ficin is from about 140° F. to about 170° F., and the optimum temperature range for trypsin activity is from about 85° F. to about 115° F. Temperatures in excess of these optimum ranges will cause the enzyme to become deactivated.

It has been found that for the meat pieces to exhibit the required physical characteristics, the protective outer layer of the meat piece in which the enzyme is deactivated without tenderizing the meat should be to a depth of at least about 1/16 inch on each side. Therefore, the temperature to which the meat pieces are subjected should be sufficient to raise the temperature of the entire outer portion of the meat pieces to a depth of at least about 1/16 inch to a degree which will deactivate the enzyme, i.e., a temperature in excess of the optimal temperature for enzyme activity.

The processed meat pieces having dispersed throughout the mass thereof an unactivated proteolytic enzyme, the entire outer surface of each of said meat pieces having said enzyme deactivated, may be stored and subsequently used in food formulations. Preferably, these meat pieces should be stored in a frozen condition.

Ultimately, the enzyme in the interior of the meat pieces is to be activated in order to tenderize the meat pieces. This activation of the interior enzyme may be performed by adjusting the temperature at the core of the meat pieces to the optimal temperature for the tenderizing activity of the particular enzyme. The temperature at the core of the meat piece should be held at this optimal level until sufficient tenderization has been accomplished. The interior of the meat piece should be tenderized to a level of at least about 6 on a tenderization scale wherein 1 represents tough meat and 10 represents mushy meat.

As soon as the interior of the meat has been tenderized to a sufficient degree, the enzyme is deactivated as rapidly as possible without causing a deleterious effect to the surface of the meat. This deactivation may be by any conventional heating technique including microwave heating.

Alternatively, the selective deactivation of the enzyme at the surface of the meat and/or the deactivation of the enzyme at the core of the meat piece after the meat piece has been tenderized may be performed by techniques other than heating. Exemplary of such possible deactivation techniques are controlled treatment of the meat with a chemical inhibitor of enzyme activity such as an oxidizing agent, e.g., hydrogen peroxide, or a chemical salt, e.g., a mercury salt. Another alternative procedure for deactivating the enzyme is to adjust the pH of the meat surfaces to a level below pH 2.5 which will deactivate the enzyme.

The following examples are intended to illustrate specific embodiments of the invention and should not be considered to impose any limitations on the invention.

EXAMPLE I

Papain (1.81 mg. per pound of meat) was added to "fresh" (utility grade) beef clods by the nitrogen gas propellent method described in Pat. No. 3,216,826. The clods were held for 20 hours. The temperature of the meat was then adjusted to between 24°–30° F. and the meat diced into approximately 1-inch cubes. These cubes were placed into a boiling water bath for 4 minutes in order to heat the surface (1/16–1/8) inch deep to 210° F. and also to raise the center temperature of the cube into the temperature range of 150–180° F. The cubes were then removed from the boiling water and placed into 180° F. water and held there for 1¼ hours. After this treatment, the cubes were mixed with other particulate food materials in gravy. The mixture was heated by a rapid heating to above 210° F. and held for in excess of 15 minutes to deactivate substantially all the enzyme. The product was then chilled to eating temperature of about 130° F. Tenderness scores for the meat pieces indicated about an 8–9 rating on a 10 point scale, with 1 being tough and 10 mushy. The outside layer (about the outer 1/16 inch layer) had excellent bite.

EXAMPLE II

Bromelain (1.81 mg. per pound of meat) was added to "fresh" (utility grade) beef clods by the nitrogen gas propellent method described in Pat. No. 3,216,826. The clods were held for 20 hours. The temperature of the meat was then adjusted to between 24°–30° F. and the meat diced in approximately 1-inch cubes. The cubes were placed into a boiling water bath for 2½ minutes in order to heat the surface at least 1/16 inch deep to about 190° F. and also to raise the center temperature of the cube up to a temperature of above 140° F. The cubes were then removed from the boiling water and placed into 160° F. water and held there for 1¼ hours. After this treatment, the cubes were mixed with other particulate food materials in gravy. The mixture was heated by rapid heating to above 180° F. and held for in excess of 15 minutes to deactivate substantially all the enzyme. The product was then chilled to eating temperature of about 130° F. Tenderness scores for the meat pieces indicated about an 8–9 rating on a 10 point scale, with 1 being tough and 10 mushy. The outside layer (about the outer 1/16 inch layer) had excellent bite.

EXAMPLE III

Ficin (1.81 mg. per pound of meat) was added to "fresh" (utility grade) beef clods by the nitrogen gas propellent method described in Pat. No. 3,216,826. The clods were held for 20 hours. The temperature of the meat was then adjusted to between 24°–30° F. and the meat diced in approximately 1-inch cubes. The cubes were placed into a boiling water bath for 2½ minutes in order to heat the surface at least 1/16 inch deep to 180° F. and also to raise the center temperature of the cube up to a temperature above 140° F. The cubes were then removed from the boiling water and placed into 160° F. water and held there for 1¼ hours. After this treatment, the cubes were mixed with other particulate food materials in gravy. The mixture was heated by rapid heating to above 180° F. and held for in excess of 15 minutes to deactivate substantially all the enzyme. The product was then chilled to eating temperature of about 130° F. Tenderness scores for the meat pieces indicated about an 8 rating on a 10 point scale, with 1 being tough and 10 mushy. The outside layer (about the outer 1/16 inch layer) had excellent bite.

EXAMPLE IV

Trypsin (1.81 mg. per pound of meat) was added to "fresh" (utility grade) beef clods by the nitrogen gas propellent method described in Pat. No. 3,216,826. The clods were held for 20 hours. The temperature of the meat was then adjusted to between 24°–30° F. and the meat diced into approximately 1-inch cubes. These cubes were placed into approximately 180° F. water bath for 3 minutes in order to heat the surface at least 1/16 inch deep to above about 140° F. and also to raise the center temperature of the cube to 100° F. The cubes were then removed from the boiling water and placed into 110° F. water and held there for 1¼ hours. After this treatment, the cubes were mixed with other particulate food gravy materials in gravy. The mixture was heated by rapid heating to above 140° F. and held for in excess of 15 minutes to deactivate substantially all the enzyme. The product was then chilled to eating temperature of about 130° F. Tenderness scores for the meat pieces indicated about a 7–8 rating on a 10 point scale, with 1 being tough and 10 mushy. The outside layer (about the outer 1/16 inch layer) had excellent bite.

EXAMPLE V

By the procedure of Example I, approximately 1-inch beef cubes were prepared. The temperature of the cubes was then adjusted to between 36°–40° F. and the cubes were dipped into a solution containing approximately 100 p.p.m. of hydrogen peroxide to deactivate the enzyme by adding approximately 50 to 90 p.pm. in the outer layer, not less than 1/16 inch deep of the cube. The dipped cubes were than placed into 180° F. water and processed according to the procedure of Example I.

EXAMPLE VI

By the procedure of Example IV, approximately 1-inch beef cubes were prepared. The temperature of the cubes was then adjusted to between 36°–40° F. and dipped for 15 to 30 minutes into a 10% solution of ascorbic acid (pH 2.2–2.4) to reduce the pH of the outer 1/16 inch surface to approximately 2.2, and thereby deactivate the enzyme in this outer layer. The dipped cubes then were placed into 110° F. water and processed according to the procedure of Example IV.

Obviously many modifications and variations of the invention may be made without departing from the spirit and scope thereof, and, therefore, only those limitations should be imposed as are indicated in the appended claims.

We claim:

1. A method of processing meat pieces for use in the preparation of cooked meat products comprising: introducing a proteolytic enzyme into a primal meat cut, allowing the enzyme to disperse throughout the meat, cutting the enzyme-treated meat into pieces, and selectively deactivating the enzyme in the entire outer surface of the meat pieces before tendering occurs and to a sufficient depth so that the outer layer will act as a protective cover for the meat pieces while maintaining the enzyme in the interior portion of said meat pieces substantially inactive and available for subsequent tenderization of said interior portion.

2. The method of claim 1 wherein the amount of proteolytic enzyme introduced is greater than about .001 mg. per pound of meat.

3. The method of claim 1 wherein the proteolytic enzyme is selected from the group consisting of papain, bromelain, ficin, trypsin and mixtures thereof.

4. The method of claim 1 wherein the outer surface of the meat piece, in which the enzyme is selectively deactivated, is to a depth of at least about 1/16 inch.

5. The method of claim 1 wherein the selective deactivation of the outer surface is preformed by heating the meat pieces to a temperature which will deactivate the enzyme in said outer surface.

6. The method of claim 1 wherein the selective deactivation of the outer surface is performed by treating the meat pieces with an oxidizing agent.

7. The method of claim 1 wherein the selective deactivation of the outer surface is performed by treating the meat pieces with an enzyme activity inhibitor chemical salt.

8. The method of claim 1 wherein the selective deactivation of the outer surface is performed by adjusting the pH of the outer surface of the meat pieces to a level of below pH 2.5.

9. A method of processing meat pieces for use in the preparation of food products comprising: introducing a proteolytic enzyme into a primal meat cut, allowing the enzyme to disperse throughout the meat, cutting the enzyme-treated meat into pieces and selectively deactivating the enzyme in the entire outer surface of the meat pieces to a sufficient depth so that the outer layer will act as a protective cover for the meat pieces and the remaining interior portion of said meat pieces containing unactivated enzyme available for activation by heating, activating the enzyme at the interior of the meat pieces for a period sufficient to tenderize the interior portion thereof, and then deactivating the enzyme at the interior of the meat pieces.

10. The method of claim 9 wherein the amount of proteolytic enzyme introduced is greater than about .001 mg. per pound of meat.

11. The method of claim 9 wherein the proteolytic enzyme is selected from the group consisting of papain, bromelain, ficin, trypsin and mixtures thereof.

12. The method of claim 9 wherein the outer surface of the meat pieces, in which the enzyme is selectively deactivated, is to a depth of at least about 1/16 inch.

13. A processed meat piece having dispersed throughout the mass thereof an unactivated proteolytic enzyme, the entire outer surface of said meat piece having said enzyme deactivated before tendering of the meat piece occur to a sufficient depth so that the outer layer will act as a protective cover for the meat piece and the remaining interior portion of said meat piece containing unactivated enzyme available for activation by heating.

References Cited

UNITED STATES PATENTS

| | | | |
|---|---|---|---|
| 2,314,313 | 3/1943 | Rinehart | 99—107 X |
| 2,321,625 | 6/1943 | Ramsbottom et al. | 99—107 |
| 2,903,362 | 9/1959 | Beuk et al. | 99—107 |

OTHER REFERENCES

Tauber: "The Chemistry and Technology of Enzymes," 1949, published by John Wiley and Sons, Inc., New York, p. 18.

HYMAN LORD, Primary Examiner

U.S. Cl. X.R.

99—187, 194